Aug. 31, 1926.

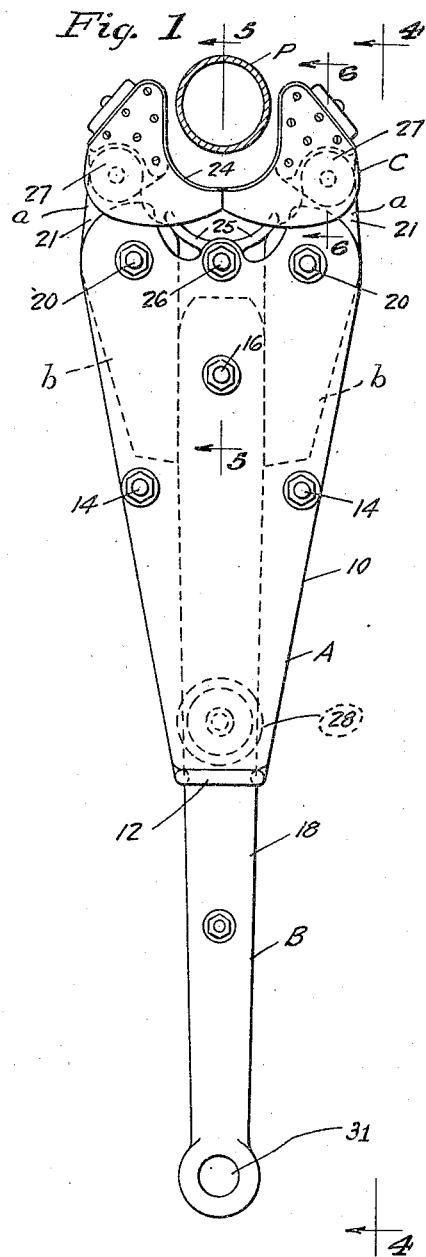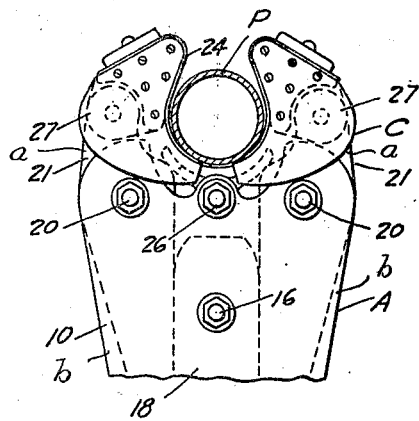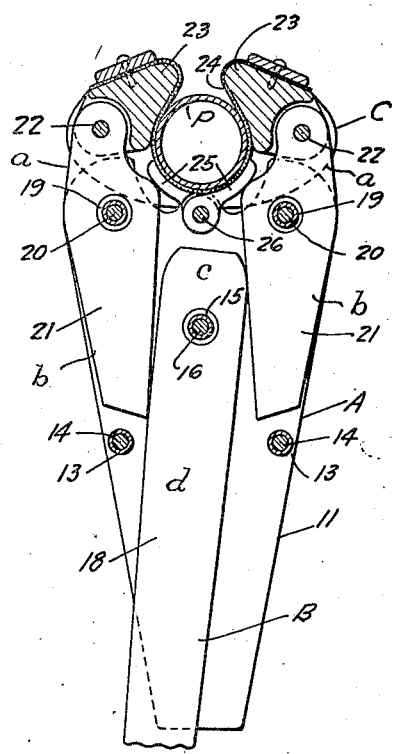

J. GRANT ET AL

PIPE TONGS

Filed July 11, 1923

1,597,966

2 Sheets-Sheet 2

Inventors
John Grant
Stewart L. Campbell
by Nestall and Wallace
Their Attorneys

Patented Aug. 31, 1926.

1,597,966

UNITED STATES PATENT OFFICE.

JOHN GRANT, OF LOS ANGELES, AND STEWART L. CAMPBELL, OF BERKELEY, CALIFORNIA; SAID CAMPBELL ASSIGNOR TO SAID GRANT.

PIPE TONGS.

Application filed July 11, 1923. Serial No. 650,829.

This invention relates to a tool for gripping pipe, casing, cylindrical bodies and the like for the purpose of turning or twisting or holding them against turning. The embodiment of the invention disclosed herein is adapted for use in oil well drilling and the tool when so used bears the technical names of pipe or casing tongs.

In drilling oil wells, it is necessary during the course of the work to screw and unscrew casing, pipe, collars, and tool joints. In rotary drilling, a torsional strain is placed on the pipe tending to rupture and break the same. Due to the great strain placed thereon, it is necessary to have an uninjured or undamaged pipe, otherwise, rupture or breakage will occur. Tongs as now used embrace the work with the gripping element, and exert pressure thereon at a number of separated places about the periphery, some even having means to bite into the pipe. This means of gripping the pipe may cause damage by crushing, denting or producing crystallization, resulting in the pipe eventually twisting off when a torsional strain is placed thereon.

The present invention has for its objects, first, the provision of tongs which will embrace the work and exert uniform pressure thereon over the entire embraced surface; second, to provide tongs which may be clamped to the work and removed without any independent locking element, such as latches or the like; third, to provide tongs which will grip the pipe when the handle is turned to either the right or left not requiring reversal of the tongs upon the work; fourth, to provide tongs having a flexible work engaging and gripping element which is removable with ease and facility; and fifth, to provide tongs which may be used with liner adapters to adjust it to use with numerous sizes of pipe.

Figure 4:
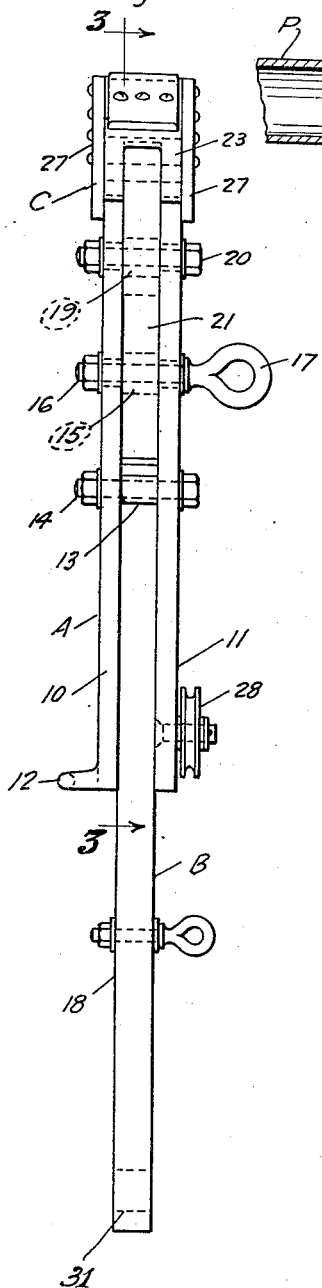
Figure 5:
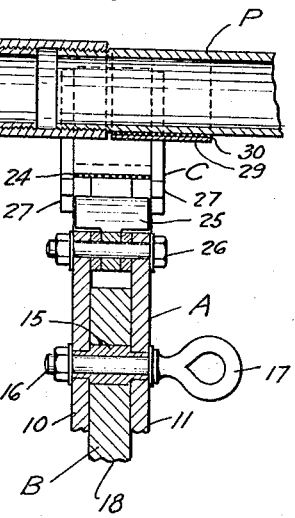
Figure 6:
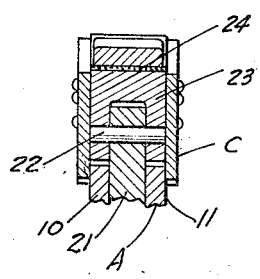
Figure 7:
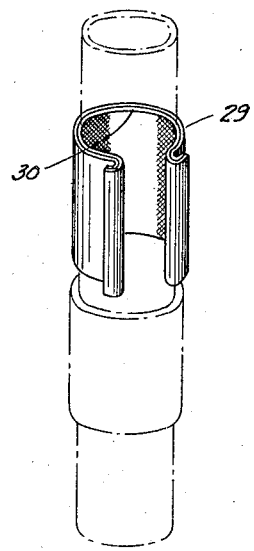

These objects together with other objects and corresponding accomplishments are obtained by means of the embodiment of our invention illustrated in the accompanying drawing, in which:

Fig. 1 is a plan view of tongs about to be engaged with a pipe, the latter being shown in section; Fig. 2 is a plan view of a fragment of the tongs showing it in position embracing the pipe; Fig. 3 is a plan view with a cheek removed as shown in the line 3—3 of Fig. 4, the jaws being in gripping position; Fig. 4 is a side elevation of the tongs; Fig. 5 is a section as seen on the line 5—5 of Fig. 1, an axial section through a pipe and collar and a liner being shown mounted upon the pipe. Fig. 6 is a fragmentary section as seen on the line 6—6 of Fig. 1; and Fig. 7 is a perspective view of a liner adapter, its position upon the pipe at a collar being indicated by the pipe and collar being shown in dotted lines.

Referring more particularly to the drawing, the tongs comprise a head indicated by A having a handle B attached thereto. Supported in the head is the work engaging structure indicated generally by C.

The head comprises similar plates 10 and 11 spaced from each other. The plates are the same in structure except that plate 10 has at one end a handle 12 for manipulating the tongs in clamping the work engaging means to the work. The plates are spaced from each other by spacing bushings 13 and bolts 14 securing the plates together. Other bolts as later described also serve to space and secure the plates in position. At the center of the head is a bearing bushing 15 through which passes a bolt 16 having an eye head 17 whereby tackle may be secured thereto to support the tongs and move it from place to place.

The handle B comprises a lever 18 pivotally mounted upon the bushing 15 so as to provide a short or outer arm $c$ and a long or inner arm $d$. The long arm of the lever extends beyond the back of the head and forms a handle for manipulation of the tool. The end of the handle is provided with eye 31 whereby a rope or line may be attached thereto. The short arm of the lever is rounded or beveled at the corners.

At the opposite sides of the head adjacent the face and extending between the plates are bearing bushings 19, through which are passed bolts 20. Mounted upon the bolts are jaws. These jaws comprise rockers having girdle blocks, and are similar in construction and only one will be described. A rocker is indicated by 21 and is in the form of a lever with its inner or long arm $b$ resting against the lever 18 and extending beyond its pivotal axis toward the back of the head as indicated in the drawing. Mounted upon the outer or short arm $a$ of the rocker by means of a pivot pin 22, see Fig. 3, are girdle blocks 23 forming the lips of a mouth in which the work is received. Attached to the girdle blocks so as to be supported therebetween is a girdle or band of flexible material indicated by 24. The band is preferably constructed of the same material as brake linings. The head is recessed to receive guards 25 which are pivotally mounted upon a bolt 26 extending between the plates of the head. The girdle blocks are so rounded that when in open position, as shown in Fig. 1, a pipe indicated by P may readily pass through the mouth. Each girdle block has at its sides cheeks 27. These cheeks have extensions which are adapted to abut one another when in open position, as shown in Fig. 1, and thereby limit the opening of the girdle blocks.

Assume that the parts are in the position shown in Fig. 1, and it is desired to engage the tongs with the pipe P so as to grip the same. The handle lever 18 is in intermediate position in the head, rocker arms 21 resting against its sides. The girdle blocks are disposed with the mouth affording the widest opening.

The girdle rests against the girdle blocks as shown. The tongs are then pushed forward against the pipe, the latter entering between the girdle blocks and engaging the cheeks 27, as shown in Fig. 2. Continued pressure of the tongs against the pipe causes the cheeks to swing so as to close the girdle blocks about the pipe. The handle 12 is now grasped and the head held against movement. The handle B is then pulled in the direction in which it is desired to twist or turn the pipe. This causes the handle lever 18 to swing with respect to the head, as shown in Fig. 3. Pressure is exerted upon the rocker arms 21 tending to force the long or inner arms outwardly and the ends carrying the girdle blocks inwardly. This tightens the girdle about the pipe as shown in Fig. 3. The greater the pressure placed upon the handle lever, the firmer the grip of the girdle upon the pipe. It is obvious that the grip may be obtained by moving the handle in either direction and maintaining the head stationary. To remove the tongs, the head is held by the handle 12 and the handle lever 18 swung to its intermediate position. Usually merely swinging the handle lever in the opposite direction will effect the result of placing the handle in its intermediate position without holding the head of the tool. The parts are then in the position shown in Fig. 2. By pulling the tongs away from the pipe, the latter will engage the girdle blocks and swing them outwardly to permit the pipe to pass through the mouth.

We have provided a pulley upon the head of the tongs, as indicated by 28 so that rope may be passed around one tongs from another to link the two together by a tackle such that one man may operate two tongs. It is usual to grip one pipe or a collar with one tongs and the other pipe by another tongs exerting pressure upon the handles in opposite direction.

It is obvious that the tongs will adapt itself to pipe of different diameters within a limited range of sizes. However, the tongs may be made to serve for use with smaller pipes by providing liner adapters shown in Fig. 7. The liner adapter shown therein comprises a split sleeve having resilient metal as a foundation, this foundation being indicated by 29. The ends are bent to form convenient hand grips in removing the adapter from a pipe. The adapter is lined with a flexible material such as brake lining 30. The thickness of the adapter is such as to build up the pipe when placed thereon to a diameter convenient for the tongs. In Fig. 5 two sections of pipe indicated by P are shown connected by a collar and a liner on one of the pipes.

What we claim is:

1. Tongs comprising in combination a head, girdle means mounted on said head for engaging the work and including a flexible band suspended therefrom at its ends and disposed to embrace the work, said girdle means being in the form of a mouth, means at said mouth connected to said girdle means so that pressure at the back thereof by the work will close said girdle means about the work, a handle mounted in said head and operatively connected to said girdle means so that lateral pressure on said handle in either direction will cause said band to grip and hug the work.

2. Tongs comprising in combination a head, rockers pivotally mounted on said head for embracing the work, girdle blocks pivotally mounted on said rockers, a flexible girdle suspended from said blocks to engage and grip the work, cheeks secured to said blocks to embrace the work, said cheeks being arranged to meet and engage each other when said girdle blocks are in their full open position and being disposed to swing said girdle blocks about the work when pressed toward said head, a handle mounted in said head to swing therein, said handle being disposed to operate said rockers so as to swing the latter toward each other and cause said girdle to hug the work with a pressure corresponding to that exerted upon said handle.

3. Tongs comprising in combination a head, rockers pivotally mounted on said head for embracing work, girdle blocks pivotally mounted on said rockers, a flexible girdle secured between said blocks so as to engage and grip the work, cheeks secured to said blocks to embrace the work, said cheeks being arranged to meet and engage each other when said girdle blocks are in their full open position and disposed to swing said girdle blocks about the work when pressed toward said head, a handle lever pivotally mounted in said head between said rockers, said handle lever being disposed so that the arms thereof will engage the arms of said rockers and spread the last mentioned arms whereby to swing said rockers and cause said girdle to hug the work with a pressure corresponding to that exerted upon said handle lever.

4. Tongs comprising in combination a head, a handle lever pivotally mounted therein, spaced rockers pivotally mounted on said head to form levers having outer and inner arms, said outer arms extending beyond the outer end of said head, the ends of the inner arms of said rockers extending inwardly beyond the pivotal axis of said lever, the end of the outer arm of said handle being disposed inwardly beyond the pivotal axis of said rockers whereby swinging of said handle lever in either direction will swing the inner arms of said rocker away from each other, girdle blocks having concave jaws opposed to each other pivotally secured to the outer arms of said rockers, a flexible girdle band for embracing and hugging the work secured at its ends to said blocks, segmental cheeks secured to said blocks to embrace the work, said cheeks being arranged to meet and engage each other when said girdle blocks are in their full open position and being disposed to swing said girdle blocks about the work when pressed toward said head.

5. Tongs comprising in combination a head having spaced plates, a handle lever pivotally mounted therein between said plates, spaced rockers pivotally mounted between said plates to form levers so that their outer arms extend beyond the outer end of said head, the ends of the inner arms of said rockers extending inwardly beyond the pivotal axis of said handle, the end of the outer arm of said lever being disposed inwardly beyond the pivotal axis of said rockers whereby swinging of said handle lever in either direction will swing the inner arms of said rockers away from each other, girdle blocks forming a mouth pivotally secured to the outer arms of said rockers, a flexible girdle band for embracing and hugging the work secured at its ends to said blocks, segmental cheeks secured to said blocks to embrace the work, said cheeks being arranged to meet and engage each other when said girdle blocks are in their full open position and disposed to swing said girdle blocks about the work when pressed toward said head.

6. Tongs comprising in combination a head having spaced plates, a handle lever pivotally mounted thereon between said plates, spaced rockers pivotally mounted between said plates to form levers having outer and inner arms extending beyond the outer end of said head, the ends of the inner arms of said rockers extending below the pivotal axis of said handle lever, the end of the outer arm of said handle lever being disposed inwardly beyond the pivotal axis of said rockers whereby swinging of said handle lever in either direction will swing the inner arms of said rockers away from each other, girdle blocks having concave jaws opposed to each other pivotally secured to the outer arms of said rocker, a flexible girdle band for embracing and hugging the work secured at its ends to said blocks, segmental cheeks secured to said blocks to embrace the work, said cheeks being arranged to meet and engage each other when said girdle blocks are in their full open position and disposed to swing said girdle blocks about the work when pressed toward said head.

In witness that we claim the foregoing I have hereunto subscribed my name this 23rd day of June, 1923.

JOHN GRANT.

In witness that we claim the foregoing I have hereunto subscribed my name this 28th day of June, 1923.

STEWART L. CAMPBELL.